US006832755B2

(12) United States Patent
Kohlert

(10) Patent No.: US 6,832,755 B2
(45) Date of Patent: Dec. 21, 2004

(54) CLAMPING ELEMENT

(75) Inventor: Rudolf Kohlert, Stockstadt (DE)

(73) Assignee: A. Römheld GmbH & Co. KG, Laubach (DE)

( * ) Notice: Subject to any disclaimer, the term of this patent is extended or adjusted under 35 U.S.C. 154(b) by 45 days.

(21) Appl. No.: 10/200,873

(22) Filed: Jul. 22, 2002

(65) Prior Publication Data

US 2003/0025260 A1 Feb. 6, 2003

(51) Int. Cl.[7] .................................................. B23Q 3/08
(52) U.S. Cl. ........................................................ 269/25
(58) Field of Search ............................. 269/25, 32, 33, 269/34, 20, 30, 217, 233, 234

(56) References Cited

U.S. PATENT DOCUMENTS 1,736,363 A * 11/1929 Ramsden ..................... 269/33
1,812,959 A * 7/1931 Judd ........................... 269/33
2,679,177 A * 5/1954 Gepfert ....................... 269/33
6,471,200 B2 * 10/2002 Maffeis ....................... 269/34

OTHER PUBLICATIONS

Römheld Workholding Systems, Sep. 1995, Parallel Slide Centering Element, H 4.307 Issue 9 –95 E.

* cited by examiner

*Primary Examiner*—Robert C. Watson
(74) *Attorney, Agent, or Firm*—McGlew and Tuttle, P.C.

(57) ABSTRACT

A clamping element for clamping workpieces in a flexible position. Two slides (2 and 3) guided in parallel slide in cutouts (4 and 5), which are provided in a housing (1). The force for moving the slides is introduced via plunger pistons (9 and 10) by these pistons acting on the front sides (17 and 18) of the slides, whereby a short lever arm is formed between the introduction of the force and the action of the force. A piston (22), which is provided at its head with a wedge (23), is introduced into the housing (1) at right angles to the plane of movement of the slides. This wedge is guided in recesses (6), which are associated with the slides. Due to the piston (22) being pulled down, its wedge is jammed in the recesses (6) of the slides (2 and 3) and the wedge pushes the slides into the cutouts (4 and 5) and fixes same in a self-locking manner.

11 Claims, 6 Drawing Sheets

SECTION B-B

SECTION A-A

CLAMPING ELEMENT

FIELD OF THE INVENTION

The invention relates to a clamping element with two clamping jaws guided in parallel for clamping pieces in a flexible position, especially for supporting the workpieces in their preset clamped position at any desired point.

BACKGROUND OF THE INVENTION

Clamping elements that fix the workpiece in a positioned manner used to clamp workpieces. Labile and longer workpieces required additional clamping units, by means of which the are supported at all critical points in a defined manner. These clamping elements must be brought into contact with the workpiece after the latter has already been fixed in its position. Such clamping units must be approached such that the workpiece will not be twisted or deformed at the points at which the clamping units come into contact with it. Thus, high requirements are imposed on such clamping elements.

Clamping elements are usually actuated hydraulically. The hydraulic pressure is introduced such that the clamping element moves its clamping jaws toward each other or away from each other. Discrepancies in the hydraulic system or in the friction surfaces, which affect the moving parts, may easily lead to twisting of the workpieces.

The prior-art clamping elements do not meet these requirements in all cases. Special solutions, i.e., units adapted to the particular application, are preferred in most cases; prospectus of Römheld Spannsysteme H 4.307, 9-95 edition. This leads to a large number of components.

SUMMARY OF THE INVENTION

The object of the present invention is therefore to design a clamping element such that it can be used universally, adapts itself automatically to all conditions and, moreover, maintains its clamped position regardless of external effects, e.g., a pressure drop in the line. In addition, labile points shall be stabilized on greatly different workpieces with one element.

Thus, the present invention is based on a clamping element with two flexibly movable slides arranged in parallel, on which the clamping jaws are attached. During the clamping operations, the clamping jaws come into contact with the workpiece in a flexible position in a tong-like manner. Thus, two equal contact forces directed in opposite directions act on the workpiece at two opposite points. The actions of these two contact forces are mutually abolished according to the principle of action equals reaction and thus do no lead to deformations or twisting of the workpiece.

According to the invention, a clamping element is provided for clamping workpieces, which are already mounted in their positioned position. A supporting mount is necessary at any desired point and is provided by clamping jaws which can be moved to the workpiece and can be fixed. Two slides are guided in parallel and are slidingly guided in guide paths which are provided in cutouts of a housing. The force for moving the slides is introduced by plunger pistons which act on the front sides of the slides and thus form a short lever arm between the introduction of force and the action of the force.

The plunger pistons may be arranged in the piston plates of the housing and pressure may be admitted to them via the same hydraulic connection. The slides of the clamping element may be equipped with replaceable and attachable clamping jaws. A piston acting at right angles to the plane of the slides may be introduced into the housing under the slides. The slides may be provided with a recess which extends in a wedge-shaped manner. The piston acting at right angles to the plane of the slides may be provided at its head with a wedge, which is guided slidingly in the recess of the slides. In the clamped state, the slides may be fixed with their clamping jaws in contact with the workpiece by pressure being admitted to the piston, by the piston being pulled downward into the housing, thus pulling the wedge at its head into the recess, spreading the wedge and pressing the slides into the guide surfaces of the cutouts. The wedge may be designed such that the slides are fixed in a self-locking manner after the clamping. The slides with their clamping jaws may be moved to the workpiece with a force acting on them uniformly and cause a force that is uniform on both sides to act on the workpiece, which force fixes the workpiece in its position in an unchanged manner.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
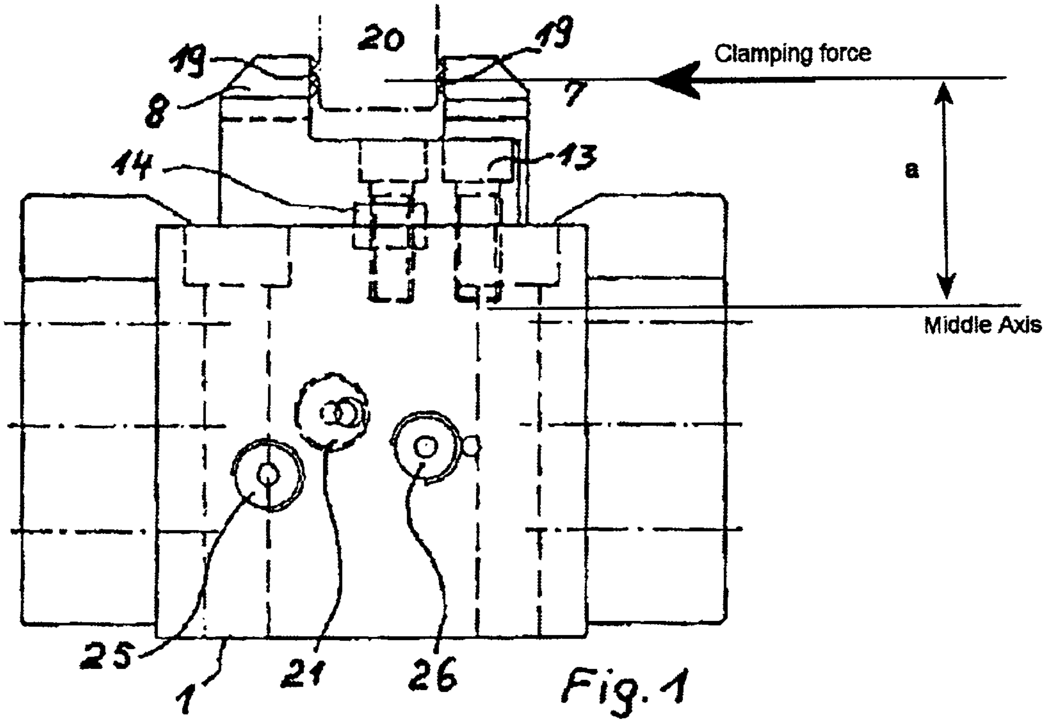
FIG. 1 is a front view of the clamping device of the invention.
Figure 2:
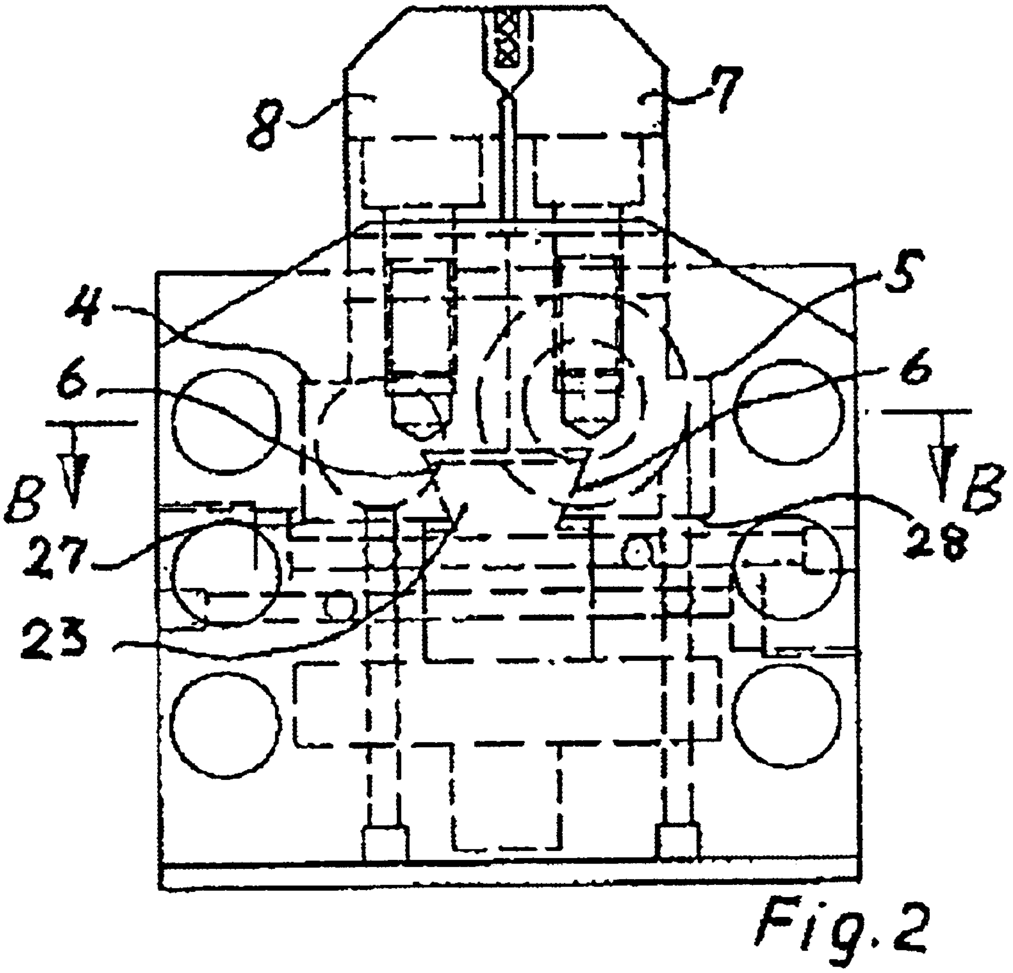
FIG. 2 is a side view of clamping device of FIG. 1.
Figure 3:
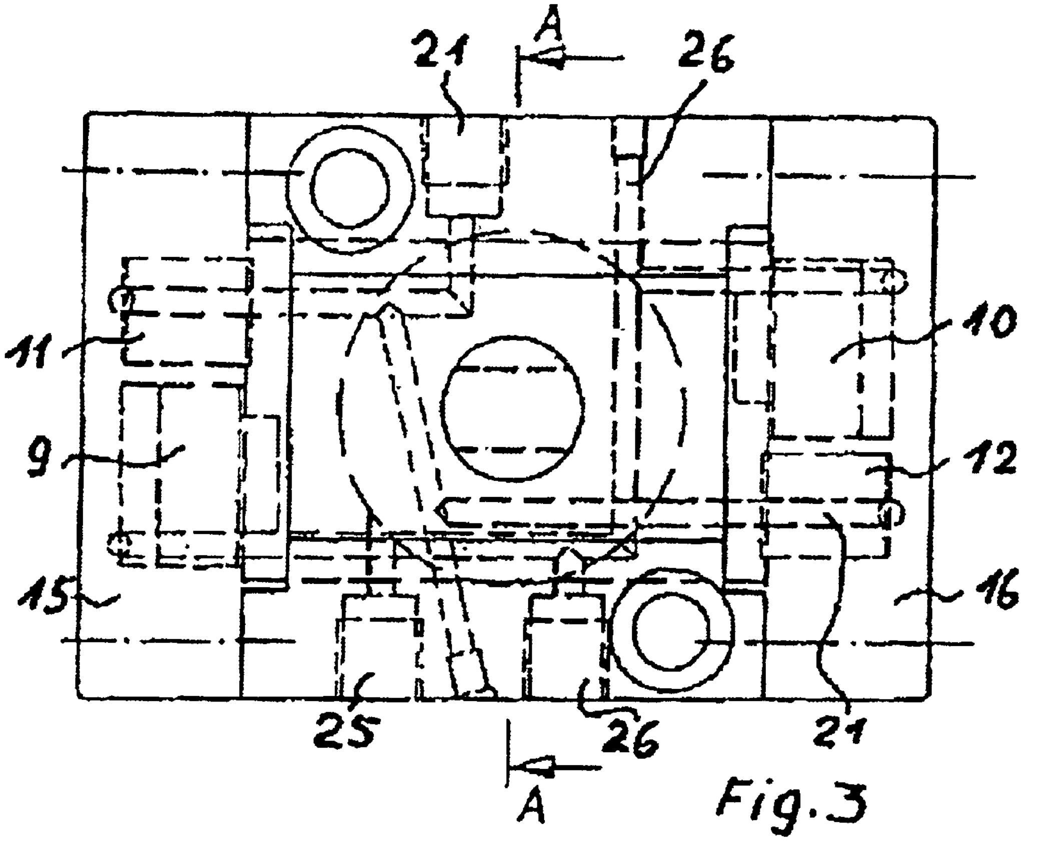
FIG. 3 is a top view of clamping device of FIG. 1.
Figure 4:
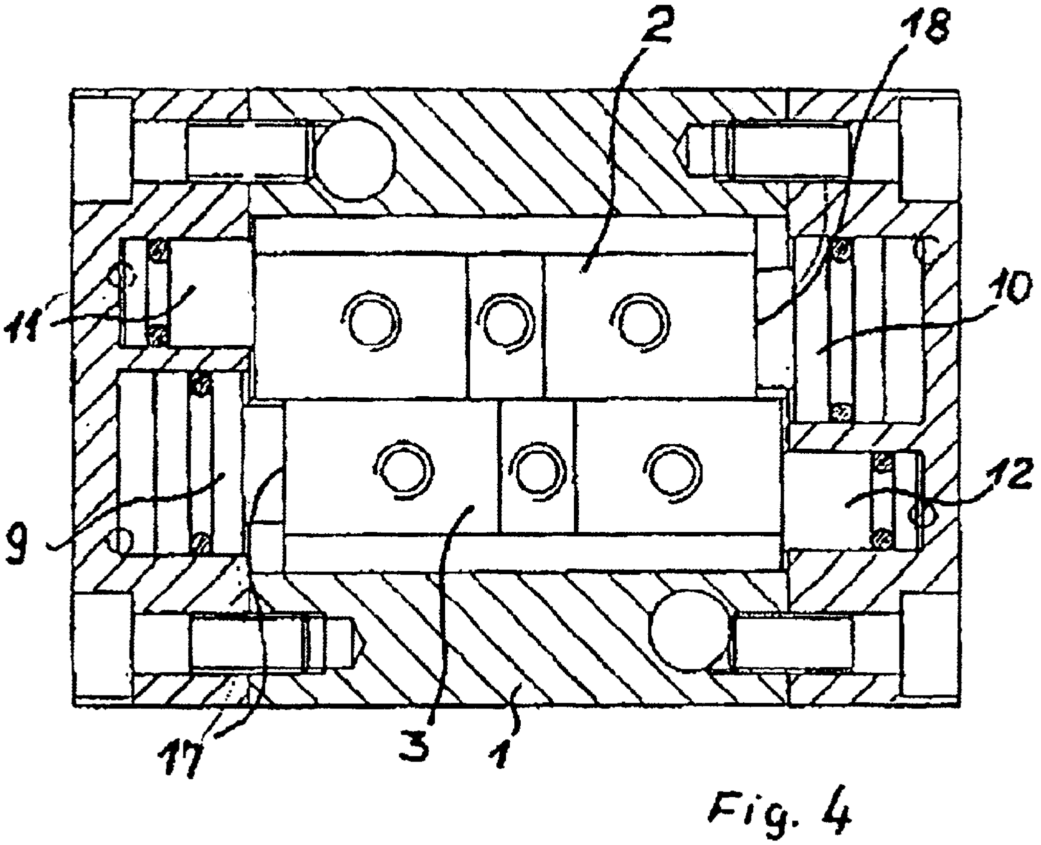
FIG. 4 is a sectional view along line B—B of FIG. 2.
Figure 5:
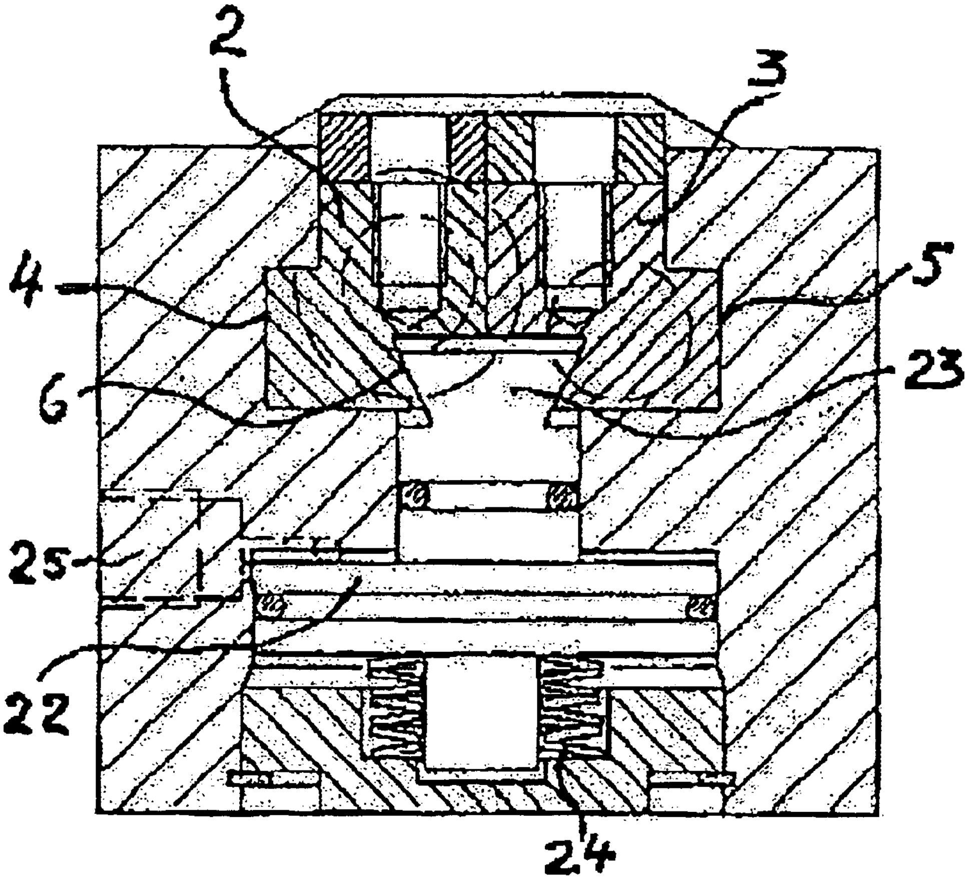
FIG. 5 is a sectional view along line A—A of FIG. 3.
Figure 6:
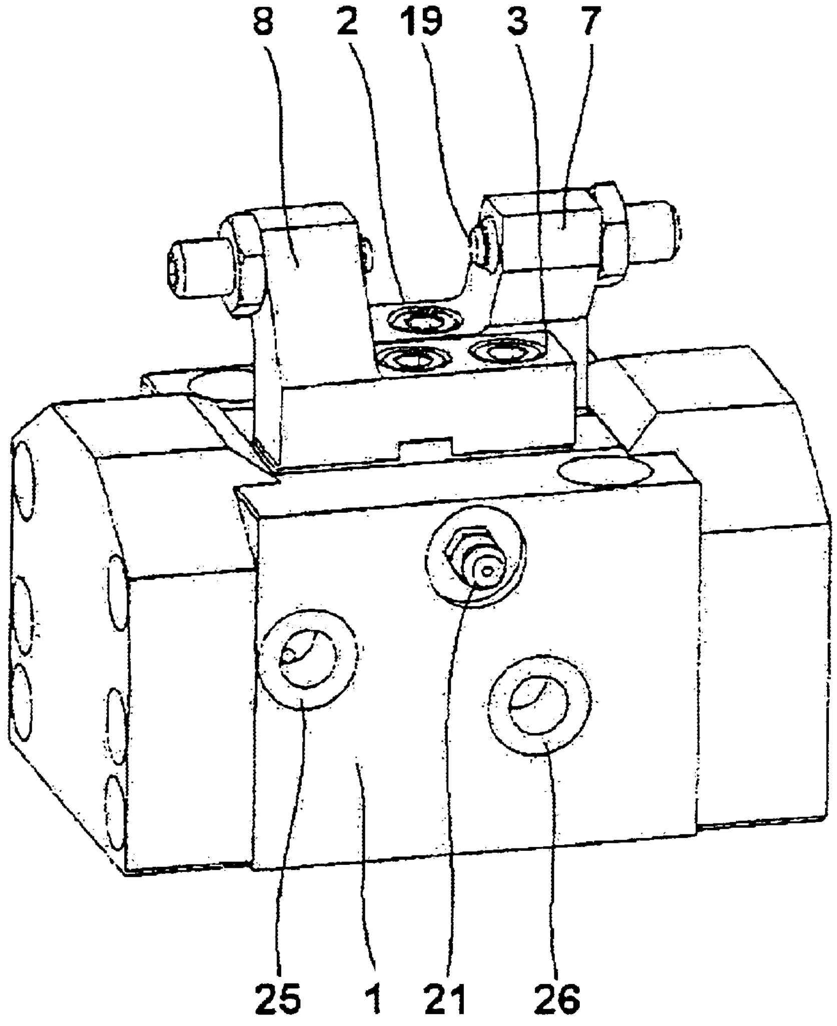
FIG. 6 is a perspective view.

Referring to the drawings in particular, two slides 2 and 3, which are guided in parallel and move in opposite directions, are slidingly introduced in cutouts 4 and 5 in the housing 1 (see FIGS. 4 and 5). The slides 2 and 3 are provided with a dovetail-like recess 6 in the lower area of their contact surfaces. The clamping jaws 7 and 8 are attached to the slides 2 and 3. These clamping jaws are replaceable and can thus be adapted to the particular workpiece. They can be fixed by means of screws 13 and sliding blocks 14. The slides 2 and 3 are driven hydraulically via the plunger pistons 9 and 10 for clamping and by means of plunger pistons 11 and 12 for release.

The plunger pistons 9 and 10 are arranged in the piston plates 15, 16 such that the force originating from them is introduced directly into the slides 2, 3 on the front sides 17, 18 of the slides 2, 3. The direction of action of the plunger pistons 9, 10 for the slides 2; 3 is thus located in the guide surfaces within the cutouts 4, 5. A pure longitudinal force is thus introduced without lateral moments, as a result of which the frictional force in the guide surfaces decreases considerably. The slides run easily and uniformly in their guide surfaces and transmit the force directly to the clamping point 19 and to the workpiece 20 without deforming these.

Equal forces directed in opposite directions are generated on the workpiece 20 according to the principle of action equals reaction. The load moment resulting from this, which is clamping force x lever arm a, is absorbed by the guide surfaces within the cutout 4, 5, the cutout 4, 5 with its guide surfaces approximately corresponding to the length of the housing. These relatively large guide surfaces contribute to the frictional forces being kept as low as possible.

A piston 22 is provided for fixing in the housing 1 under the cutout 4, 5. This piston 22 is actuated separately. It is provided at its head end with a dovetail wedge 23, which is fit exactly into a recess 6 provided in the slide 2, 3, such that the slides 2, 3 slide past the wedge 23 without contact in the released state. The slides 2, 3 are guided on their contact surfaces in the recesses 6. Pressure is admitted to the piston 22 via a hydraulic connection 25. It is returned by means of disk springs 24 associated with it. The return may also be brought about hydraulically when needed.

The clamping jaws 7, 8 are moved apart for clamping, so that the workpiece 20 can be easily received between them. When the hydraulic connection 21 is released and the hydraulic connection 26 is actuated, pressure is admitted to the plunger pistons 9, 10. The slides 2, 3 are thus displaced with their clamping jaws 7, 8 toward the workpiece. As soon as one of the clamping jaws comes into contact with the workpiece 20, it stops as a consequence of the resistance originating from the workpiece, and the second slide is still moving until its clamping jaw comes into contact with the workpiece. The clamping force now builds up uniformly between the clamping jaws and it fixes the workpiece. This compensating approach to the workpiece is ensured by the fact that both slide 2 and slide 3 with respective plunger piston 9 and plunger piston 10 are connected to the same hydraulic connection 26 and pressure is thus admitted to them uniformly. Once the frictional connection has built up at the workpiece, pressure is admitted to the piston 22 via the hydraulic connection 25. This piston 22 is pulled downward into the housing 1 upon the application of pressure. The head, designed as a wedge 23, is pulled down into the recess 6. The slides 2 and 3 are thus pressed into the guide surfaces 27 and 28 of the cutouts 4 and 5 and become fixed. The clamping element is fixed such that it remains in its position regardless of external forces as well as in the case of a pressure drop in the hydraulic system and is thus self-locking; this is brought about by the design of the wedge 23.

For release, the piston 22 is first made pressureless and the piston is again brought into its starting position by its disk springs 24. The pressing pressure for the slides is thus eliminated in the recess 6. If the pressure is released in the hydraulic connection 26 and pressure is admitted at the same time to the hydraulic connection 21, the plunger pistons 11 and 12 are actuated and the slides 2 and 3 are returned into their starting position. The workpiece 20 is released for removal.

While specific embodiments of the invention have been shown and described in detail to illustrate the application of the principles of the invention, it will be understood that the invention may be embodied otherwise without departing from such principles.

What is claimed is:

1. A clamping device for additional support of a workpiece which is mounted in a position and for which such additional support is provided at a desired point which can be moved to the workpiece, the clamping device comprising:

a housing with a central part having a first and second cutout forming first and second guide paths and with a first piston housing plate and a second piston housing plate;

a first slide guided in said first guide path, said first slide having a front side;

a second slide guided in said second guide path in parallel to said first slide, said second slide having a front side;

a first plunger piston arranged in first piston plate of said housing; and a second plunger piston arranged in second piston plate of said housing, said first plunger piston generating force on said front side of said first slide for moving said first slide independently of said second plunger piston and second plunger piston generating force on said front side of said second slide for moving said second slide independently of said first plunger piston via a single common hydraulic connection.

2. A clamping device in accordance with claim 1, wherein said slides are equipped with replaceable attachable clamping jaws.

3. A clamping device for additional support of a workpiece which is mounted in a position and for which such additional support is provided at a desired point which can be moved to the workpiece, the clamping device comprising:

a housing with a central part having a first and second cutout forming first and second guide paths and with a first piston housing plate and a second piston housing plate;

a first slide guided in said first guide path, said first slide having a front side;

a second slide guided in said second guide path in parallel to said first slide, said second slide having a front side;

a first plunger piston arranged in first piston plate of said housing; and a second plunger piston arranged in second piston plate of said housing, said first plunger piston generating force on said front side of said first slide for moving said first slide independently of said second plunger piston and second plunger piston generating force on said front side of said second slide for moving said second slide independently of said first plunger piston via a single common hydraulic connection, said clamping device further comprising:

another piston acting at right angles to the plane of the slides, said another piston being introduced into the housing under the slides.

4. A clamping device in accordance with claim 1, wherein the slides are provided with a recess extending in a wedge-shaped manner.

5. A clamping device in accordance with claim 3, wherein said another piston is provided at its head with a wedge guided slidingly in the recess of the slides.

6. A clamping device in accordance with claim 3, wherein in the clamped state, the slides can be fixed with their clamping jaws in contact with the workpiece by pressure being admitted to said another piston by said another piston being pulled downward into the housing pulling the wedge at its head into the recess spreading the wedge and pressing the slides into the guide surfaces of said first and second cutouts.

7. A clamping device in accordance with claim 6, wherein said wedge fixes said slides in a self-locking manner after the clamping.

8. A clamping device in accordance with claim 1, wherein said slides with their clamping jaws can be moved to the workpiece with a force acting on them uniformly and cause a force that is uniform on both sides to act on the workpiece, which force fixes the workpiece in its position in an unchanged manner.

9. A clamping device for clamping support of a workpiece, the clamping device comprising:

a housing with a first and second cutout forming first and second guide paths and a first piston region and a second piston region;

a first slide guided in said first guide path, said first slide having a front side for the introduction of a force;

a second slide guided in said second guide path in parallel to said first slide, said second slide having a front side for the introduction of a force;

a first plunger piston in said first piston region and acting on said first slide front side; and a second plunger piston in said second piston region and acting on said second slide front side;

a single common hydraulic connection for supplying fluid acting on each of said first plunger piston and said second plunger piston, said first plunger piston and second plunger piston independently transmitting a portion of a force of the fluid for moving the slides independently;

a first clamping jaw having a clamping face for the action of the force, the first clamping jaw being connected to said first slide, the action of the force applied by the first clamping jaw being offset from the introduction of the force at said first slide front side, to form a short lever arm; and a second clamping jaw having a clamping face for the action of the force, the second clamping jaw being connected to said second slide, the action of the force applied by the first clamping jaw being offset from the introduction of the force at said second slide front side to form a short lever arm.

10. A clamping element in accordance with claim 9, further comprising replaceable attachable clamping jaws connected to said slides.

11. A clamping element in accordance with claim 9, further comprising another piston acting at right angles to the plane of the slides, said another piston being introduced into the housing under the slides.

* * * * *